(12) United States Patent
Kaneko et al.

(10) Patent No.: US 6,441,524 B2
(45) Date of Patent: Aug. 27, 2002

(54) ROTOR FOR SYNCHRONOUS MOTOR

(75) Inventors: Yutaro Kaneko, Yokohama; Shinichiro Kitada, Tokyo; Toshio Kikuchi, Yokosuka; Munekatsu Shimada, Hachiouji, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 2 days.

(21) Appl. No.: 09/788,441

(22) Filed: Feb. 21, 2001

(30) Foreign Application Priority Data

Feb. 25, 2000 (JP) .................................. 2000-049622
Sep. 25, 2000 (JP) .................................. 2000-290683

(51) Int. Cl.⁷ .............................................. H02K 21/16
(52) U.S. Cl. ........................ 310/156.45; 310/156.56
(58) Field of Search ................. 310/156.01, 156.38, 310/156.41, 156.43, 156.44, 156.45, 156.53, 156.56

(56) References Cited

U.S. PATENT DOCUMENTS

| | | | | |
|---|---|---|---|---|
| 3,840,763 A | * | 10/1974 | Baumann et al. | 310/156.56 |
| 4,327,302 A | * | 4/1982 | Hershberger | 310/156.56 |
| 5,191,256 A | | 3/1993 | Reiter, Jr. et al. | 310/156 |
| 5,684,352 A | | 11/1997 | Mita et al. | 310/156 |
| 5,731,647 A | | 3/1998 | Schüller et al. | 310/114 |
| 6,340,857 B2 | * | 1/2002 | Nishiyama et al. | 310/156.21 |

FOREIGN PATENT DOCUMENTS

| | | |
|---|---|---|
| GB | 1 552 694 | 9/1979 |
| JP | 9-298852 | 11/1997 |
| JP | 10-42499 | 2/1998 |
| JP | 10-51984 | 2/1998 |
| JP | 10-285847 | 10/1998 |

OTHER PUBLICATIONS

Nuio Tsuchida et al., "New Technologies for an EV Motor", Industrially–Applied Technology Conference of the Institute of Electrical Engineers of Japan, Report S.9–2, pp. S.28–S.31, 1999.

* cited by examiner

*Primary Examiner*—Nestor Ramirez
*Assistant Examiner*—Dang Dinh Le
(74) *Attorney, Agent, or Firm*—Foley & Lardner

(57) ABSTRACT

A rotor (11) for a synchronous motor is provided with a plurality of magnets (15) being substantially V-shaped in cross-section. The V-shaped cross-section is defined by an inner V-surface (25), an outer V-surface (19) and an outward face (23) facing outwardly. A first angle α is subtended between a first straight line connecting a point of intersection (31) of the outer V-surface (19) and the outward face (23) and a second straight line connecting the center (35) of the rotor (11) and the acute angle point (27). A second angle β is subtended between the first straight line and a third straight line connecting a point of intersection (33) of the inner V-surface (25) and the outward face (23). By setting the angle β to be larger than 20 percent of the angle α, leakage flux at both ends of the magnets (15) is reduced.

15 Claims, 10 Drawing Sheets

US 6,441,524 B2

ROTOR FOR SYNCHRONOUS MOTOR

FIELD OF THE INVENTION

This invention relates to the disposition of magnets on a rotor in a synchronous motor.

BACKGROUND OF THE INVENTION

"New Technologies for an EV Motor" published in Report S.9-2 of the Industrially-Applied Technology Conference of the Institute of Electrical Engineers of Japan in 1999 discloses the application of magnets with a V-shaped cross-section on the rotor of a synchronous motor. EV is an abbreviation of the term "Electric Vehicle".

Magnets with a V-shaped cross-section have a larger surface facing the stator situated at an outside of the rotor than magnets having a semi-circular cross-section or those having a rectangular cross-section which are generally used in rotors. Increases in the surface area of this part increase a magnetic flux formed between the coils of the stator and the magnets of the rotor. In other words, the effective magnetic flux driving the rotor to rotate is increased. The magnet is buried in a core made of laminated magnetic steel plates and is not exposed on an outer periphery of the rotor.

When magnets are covered in this manner, a reluctance torque is easily generated between the stator and the rotor. The increase of effective magnetic flux as well as the increase of reluctance torque brings an increase of output power of the motor.

SUMMARY OF THE INVENTION

Magnets having a V-shaped cross-section are magnetized so that a surface facing an inner periphery of the rotor and a surface facing an outer periphery thereof have different polarity. Thus leakage flux is formed between the ends of adjacent magnets that have different polarity.

When the distance between the ends of the magnets and an outer peripheral surface of the core is small as in the case of this rotor, leakage flux is conspicuously large.

The leakage flux decreases the effective magnet flux that drives the rotor and thus the driving efficiency of the rotor is adversely affected by leakage flux.

It is therefore an object of this invention to reduce leakage flux in a rotor provided with magnets of V-shaped cross-section.

In order to achieve the above object, this invention provides a rotor for a synchronous motor, comprising, a rotation shaft provided in the center of the rotor and rotating together with the rotor, a plurality of magnets and a core made of a magnetic material which is fixed to the rotation shaft to retain the magnets.

Each magnet has V-shaped cross-section that is defined by an inner V-surface having an acute angle point, an outer V-surface having an acute angle point and an outward face facing outwardly and connecting the inner V-surface and the outer V-surface. Each magnet is disposed to cause the acute angle points of the inner V-surface and the acute angle point of the outer V-surface to be directed towards the rotation shaft, and is magnetized to cause the inner V-surface and the outer V-surface to have a different polarity Each magnet has dimensions to cause a second angle $\beta$ to be greater than twenty percent of a first angle $\alpha$. The first angle $\alpha$ is an angle subtended between a first straight line connecting an intersection point of the outer V-surface and the outward face and the center of the rotor and a second straight line connecting the center of the rotor and the acute angle point of the outer V-surface. The second angle $\beta$ is an angle subtended between the first straight line and a third straight line connecting an intersection point of the inner V-surface and the outward face.

The details as well as other features and advantages of this invention are set forth in the remainder of the specification and are shown in the accompanying drawings.

DESCRIPTION OF THE PREFERRED EMBODIMENTS

Figure 1:
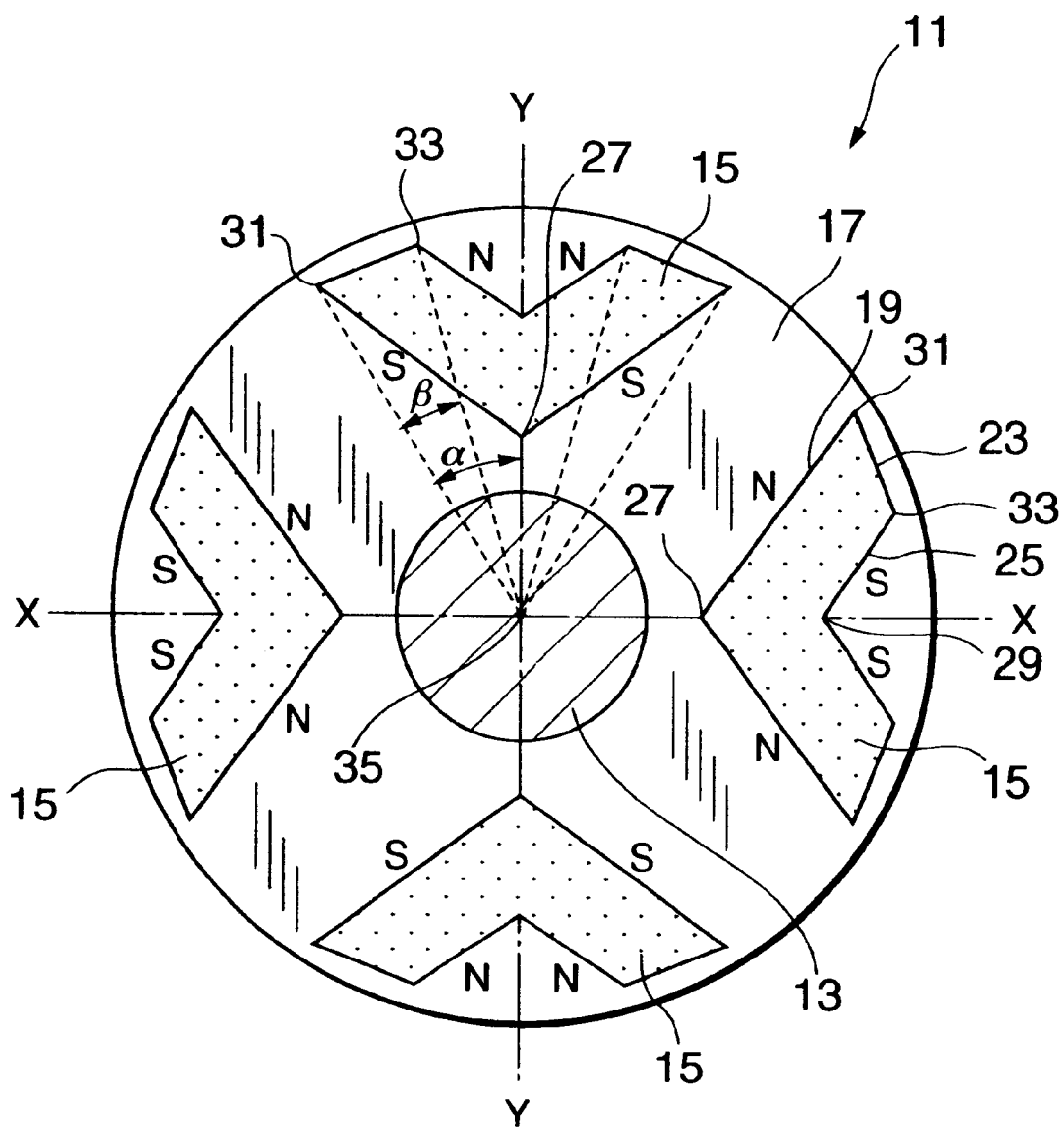
FIG. 1 is a schematic cross-sectional view of a rotor of a synchronous motor according to this invention.

Referring to FIG. 1 of the drawings, a rotor 11 of a synchronous motor is provided with a core 17 and a rotation shaft 13 fixed to the core 17. Four magnets 15 are housed at 90-degree intervals on an inner part of the core 17. A stator, not shown, is provided on an outer side of the rotor 11. The rotor 11 is rotated with the rotation shaft 13 by a magnetic force acting between the magnets 15 and rotating magnetic fields formed by the coils of the stator.

The core 17 comprises magnetic steel plates laminated in an axial direction.

Each of the magnets has a V-shaped cross-section and is axially inserted into a pre-formed matching space in the core 17. Each magnet 15 is provided with an inner V-surface 25 and an outer V-surface 19 and a pair of outward flat faces 23 facing the stator.

The outline of the cross-sectional shape of the magnet is formed by these two V-surfaces 25, 19 and the pair of outward flat faces 23. It should be noted that the inner V-shape surface 25 is facing outward, and the outer V-shape surface 19 is facing inward of the rotor 11.

The magnets 15 are magnetized beforehand so that the outer V-surface 19 and the inner V-surface 25 have opposite polarities. For example, the outer V-surface 19 is magnetized to the N pole while the inner V-surface 25 is magnetized to the S pole, or vice versa.

Two of the four magnets 15 are disposed at 180-degree intervals and are adapted so that the inner V-surface 25 is the N pole and the outer V-surface 19 is the S pole. The remaining two magnets are adapted so that the inner V-surface 25 is the S pole and the outer V-surface 19 is the N pole. As a result, the polarity of the inner V-surfaces 25 of two adjacent magnets is opposite and, in the same manner, the polarity of two outer V-surfaces 19 of adjacent magnets is opposite. The rotor 11 has two pairs of magnetic poles as a result of this pattern of disposition of magnets 15.

In order to facilitate the description of the shape of the magnets 15, the points of intersection of the surfaces of respective magnets are defined as follows.

The point of intersection of the two sloping faces comprising the outer V-surface 19 is defined as an outer acute angle point 27. The point of intersection of the two sloping faces comprising the inner V-surface 25 is defined as an inner acute angle point 29. The point of intersection of the outer V-surface 19 and the outward flat face 23 is defined as an end point 31. The point of intersection of the inner V-surface 25 and the outward flat face 23 is defined as an intersection point 33.

As stated above, two of the four magnets are disposed at 180-degree intervals. The outer acute angle point 27 and the inner acute angle point 29 of these two magnets are disposed on an axis XX passing through the central point 35 of the rotor 11. The outer acute angle point 27 and the inner acute angle point 29 of the remaining two magnets are disposed on an axis YY that passes through the central point 35 of the rotor 11 and is orthogonal to the axis XX.

As shown in the figure, an angle subtended between the axis XX and a line connecting the central point 35 of the rotor 11 and the end point 31 is defined as a first angle α.

An angle subtended between the line connecting the central point 35 and the end point 31 and a line connecting the central point 35 and the intersection point 33 is defined as a second angle β.

In this embodiment, a rotor 11 is provided with four magnets 15, the number of magnets 15 provided on the rotor 11 is not limited to four and this invention can be applied to a rotor provided with at least one pair of magnetic poles.

When a ratio of the first angle α and the second angle β is defined as an angle ratio η, the angle ratio η is given by the following formula (1).

$$\eta = (\beta/\alpha) \times 100\% \tag{1}$$

When the dimension and shape of the inner V-surface 25 is fixed, the angle ratio η varies in response to the dimension and shape of the outer V-surface 19 and the outward flat face 23.

Figure 2:
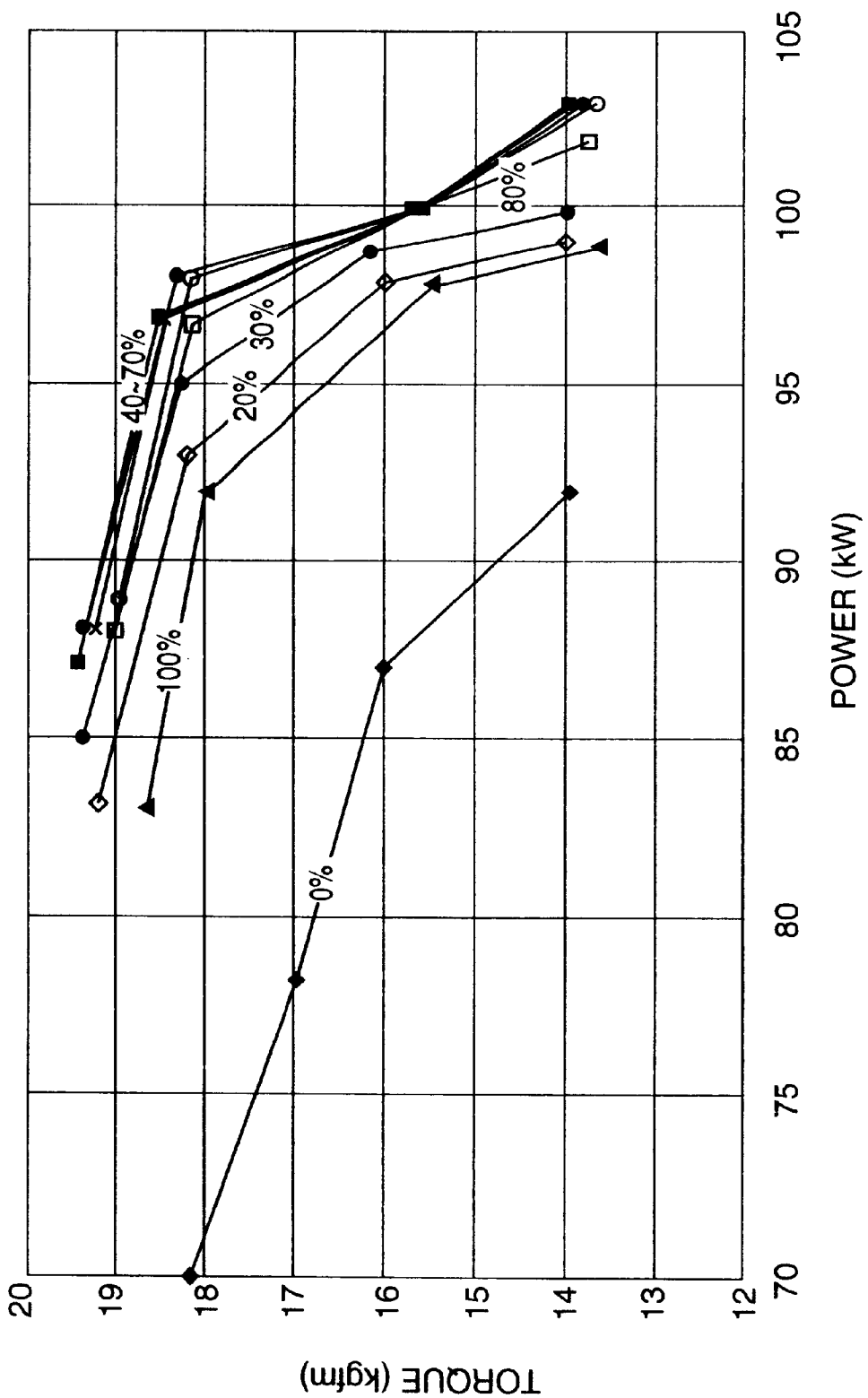
FIG. 2 is a diagram showing the variation of the relationship between the output power and torque of a synchronous motor provided with the rotor shown in FIG. 1 with respect to an angle ratio $\eta$ of the magnets.

FIG. 2 shows variations in the output power and torque of the synchronous motor with respect to an angle ratio η that is varied by varying the dimensions and shape of the outer V-surface 19 and the outward flat face 23. This diagram has been drawn by the inventors on the basis of experimental evidence.

Figure 3:
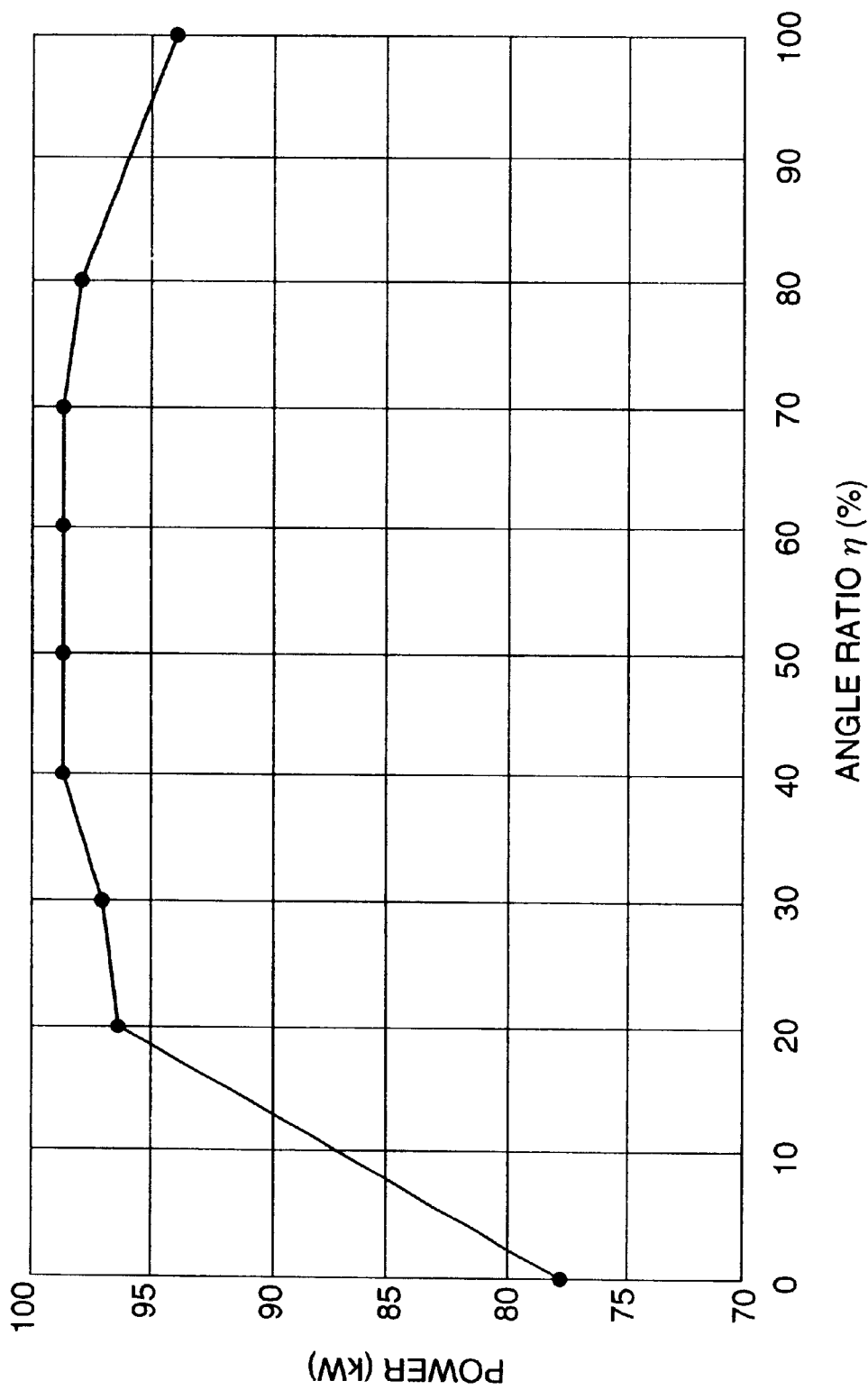
FIG. 3 is a diagram showing the relationship between the angle ratio $\eta$ and the output power of the motor when the output torque of the motor is fixed.

FIG. 3 shows the relationship between the output power of the motor and the angle ratio η when the output torque of the synchronous motor has a fixed value of 17 kgfm.

As shown in FIGS. 2 and 3, when the angle ratio η is greater than or equal to 20%, both the output power and the output torque are high. When the angle ratio η is in the range of 40–80%, both output power and the output are conspicuously high. This indicates that the effective magnetic flux is increased in this range. In other words, leakage flux between different poles of the same magnet is small in this range.

Thus it is possible to improve the output power and the output torque of the synchronous motor and reduce leakage flux by providing the rotor 11 with magnets 15 having a V-shaped cross-section and by determining the relative dimensions and shape of the outer V-surface 19 and the outward flat face 23 with respect to the inner V-surface 25 so that the angle ratio 77 is in the range of 40–80%.

Figure 4:
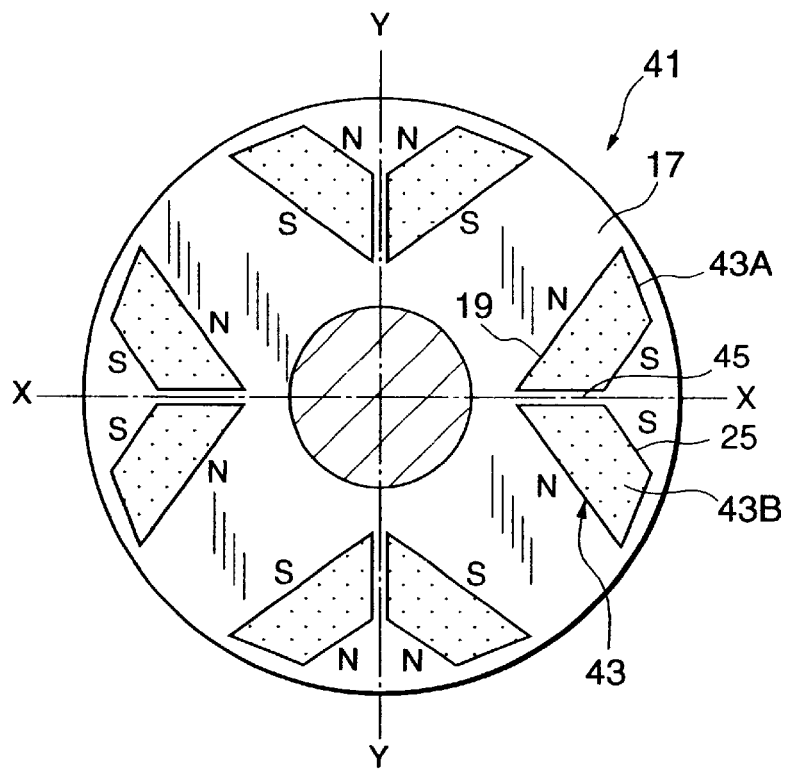
FIG. 4 is a schematic cross-sectional view of a rotor of a synchronous motor according to a second embodiment of this invention.

Referring now to FIG. 4, a second embodiment of this invention will be described.

According to this embodiment, a rotor 41 of a synchronous motor is provided with four magnets 43. Each of the magnets 43 comprises magnet elements 43A and 43B having a shape similar to the magnet 15 15 of the first embodiment but divided into two parts. The magnet elements 43A and 43B are disposed in close association sandwiching the XX axis or the YY axis as shown in the figure. Two adjacent magnet elements 43A and 43B have the same polarity. That is to say, the polarity of both outer V-surfaces 19 is the same and the polarity of both inner V-surfaces 25 is the same. A gap 45 between the magnet elements 43A and 43B is filled with magnetic steel plates comprising the cores 17.

In other words, the space housing the two magnet elements 43A and 43B comprises two independent spaces. Since a rib is provided between the magnet elements 43A and 43B, the structural strength of the rotor 11 can be enhanced according to this embodiment. Other aspects of the rotor 41 are the same as the rotor 11 according to the first embodiment.

Figure 5:
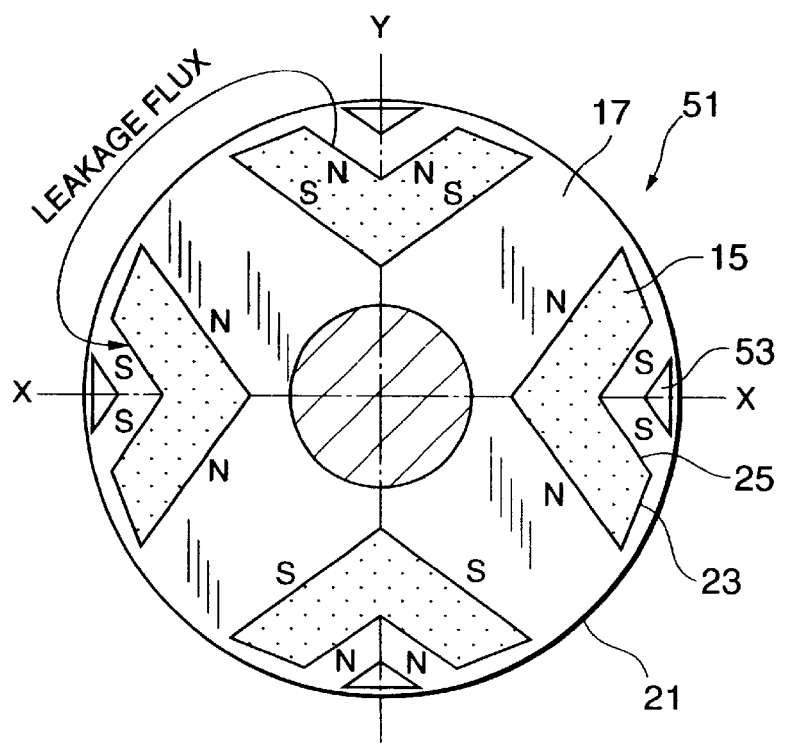
FIG. 5 is a schematic cross-sectional view of a rotor of a synchronous motor according to a third embodiment of this invention.

A third embodiment of this invention will be described with reference to FIG. 5.

A rotor 51 of a synchronous motor according to this embodiment is provided with four magnets 15 in the same manner as the first embodiment.

In this embodiment, a hollow part 53 having a triangular cross-section is formed in the core 17 between an outer periphery of the rotor 51 and the inner V-surface 25 of each magnet 15. Since the weight of the rotor 51 is reduced by this hollow part 53, it is possible to reduce the overall weight which thus allows increases in the rotation speed of the motor. Since a magnetic flux f does not flow in the hollow part 53, it is possible to control the flow of magnetic flux between the coils of the stator and the magnets 15 of the rotor 51 by the disposition and dimensions of the hollow part 53. Thus the hollow part 53 as long as suitably arranged does not affect the output/torque characteristics of the synchronous motor. Other aspects of the rotor 51 are the same as those of the rotor 11 according to the first embodiment.

Figure 6:
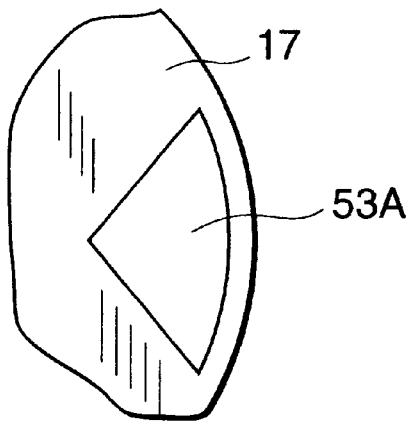
FIG. 6 is similar to FIG. 5, but showing a variation of the third embodiment of this invention with respect to a cross-sectional shape of hollow parts.

By replacing the base of the triangular cross-section of the hollow part 53 with an arc as a hollow part 63 shown in FIG. 6, further weight reductions may be realized.

Figure 7:
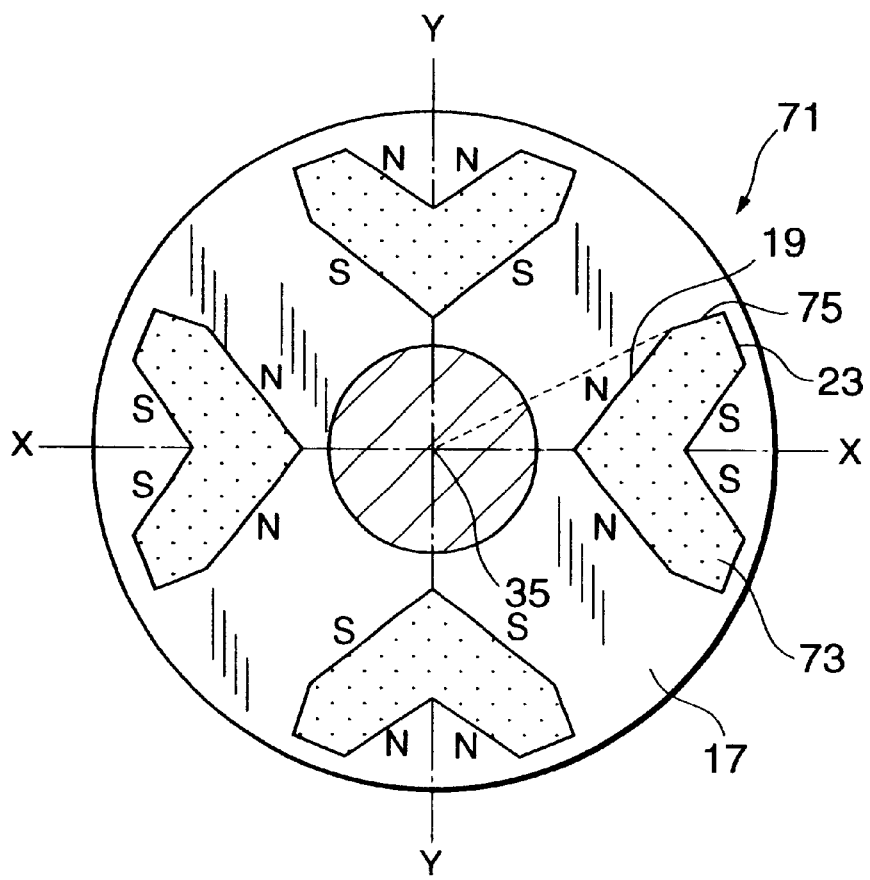
FIG. 7 is a schematic cross-sectional view of a rotor of a synchronous motor according to a fourth embodiment of this invention.

A fourth embodiment of this invention will be described with reference to FIG. 7.

A rotor 71 of a synchronous motor according to this embodiment is provided with four magnets 73. The magnets 73 are similar to the magnets 15 of the first embodiment. The only difference is that each of the magnets 73 has an end face 75 between the outer surface 19 and the outward flat face 23. The end face 75 is a flat face defined by a straight line passing through the central point 35 of the rotor 11 that is approximately orthogonal to the outward flat face 23. Other aspects of the rotor 71 are the same as the rotor 11 of the first embodiment.

By providing the end face 75 it is possible to arbitrarily set the thickness of the end portion of the magnet 73. Leakage flux flows between the ends of adjacent magnets 73 through the core. The amount of leakage flux depends on the thickness of the end portion of the magnet 73. Thus it is possible to reduce leakage flux between the ends of the magnets 73 by varying the thickness of the end portions of the magnet 73 by providing the end face 75.

Figure 8:
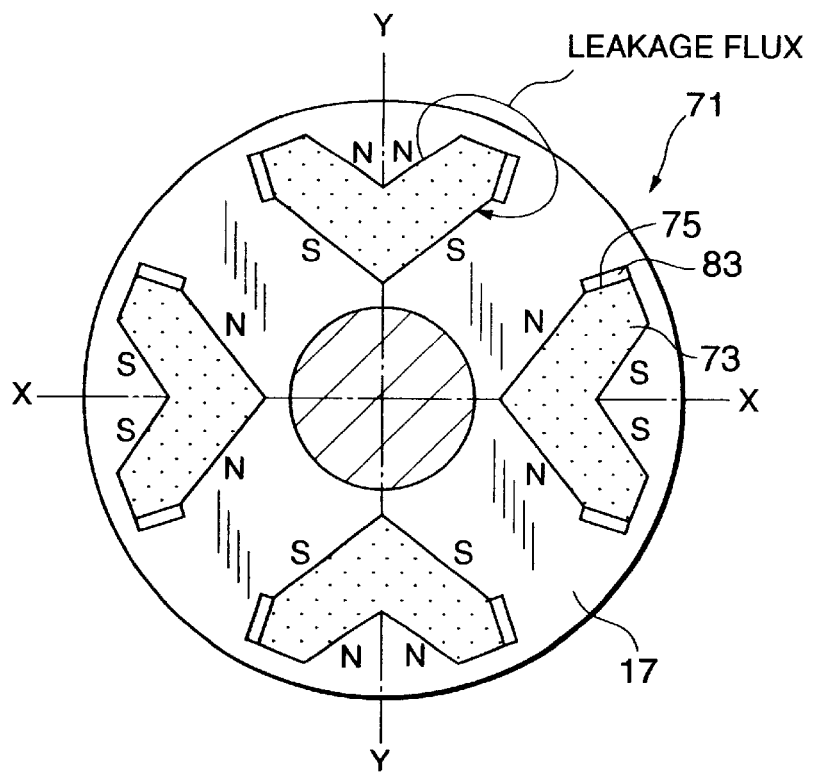
FIG. 8 is similar to FIG. 7, but showing a variation of the fourth embodiment of this invention with respect to spaces facing the magnets in a core.

By forming a hollow parts 83 in the core 17 facing the end faces 75 of the magnet 73 as shown in FIG. 8, it is possible to further reduce leakage flux between the ends of adjacent magnets 73.

Figure 9:
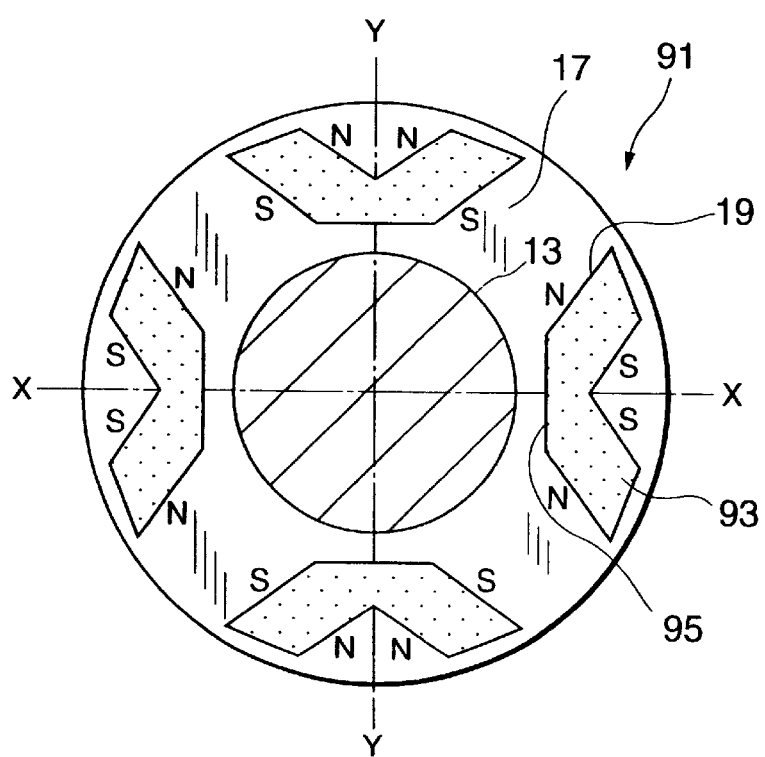
FIG. 9 is a schematic cross-sectional view of a rotor of a synchronous motor according to a fifth embodiment of this invention.

A fifth embodiment of this invention will be described with reference to FIG. 9.

A rotor 91 of a synchronous motor is provided with four magnets 93 in this embodiment.

Each of the magnets 93 has a bottom face 95. The bottom face 95 is a flat plane dissecting the outer V-surface 19 and is defined by a straight line orthogonal to the XX axis or the YY axis.

When the difference between the outer radius and the inner radius of the rotor is large, the dimensions and disposition of the magnets may be set freely. The inner radius of the rotor is determined by the radius of the rotation shaft and when the radius of the rotation shaft is relatively large with respect to the outer radius of the rotor, the thickness of the core 17 between the magnet 15 and the rotation shaft 13 may be insufficient. In this case, the magnetic flux of the magnet 15 becomes concentrated towards the rotation shaft and output power/torque characteristics of the motor may be adversely affected.

The magnet 93 in this embodiment has a bottom face 95 so that the magnet 15 does not project towards the rotation shaft 13. In this manner, even when the radius of the rotation shaft 13 is large, it is possible to ensure enough thickness of the core between the magnets 93 and the rotation shaft 13 to prevent leakage of magnetic flux of the magnet 93 towards the rotation shaft 13. Except for the bottom face 95, the rotor 91 is identical to the rotor 11 of the first embodiment.

Figure 10:
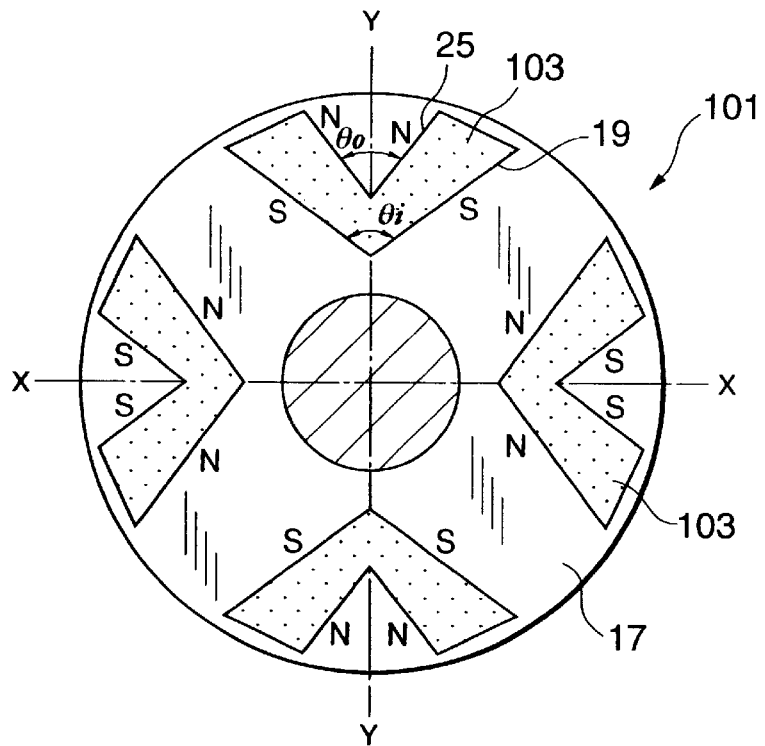
FIG. 10 is a schematic cross-sectional view of a rotor of a synchronous motor according to a sixth embodiment of this invention.

A sixth embodiment of this invention will be described with reference to FIG. 10.

A rotor 101 of a synchronous motor according to this embodiment is provided with four magnets 103 as in the case of the prior embodiments.

A narrow angle θi of the outer V-surface 19 in each magnet 103 is set to be greater than a narrow angle θo of the inner V-surface 25. In other respects, the rotor 101 is identical to the rotor 11 of the first embodiment.

This setting allows reductions in the volume of the magnet 103 and allows reductions in the weight of the rotor 101. Furthermore, since the amount of the core 17 is relatively increased due to the reduction of the volume of the magnets 103, the strength of the rotor 101 is also increased.

Figure 11:
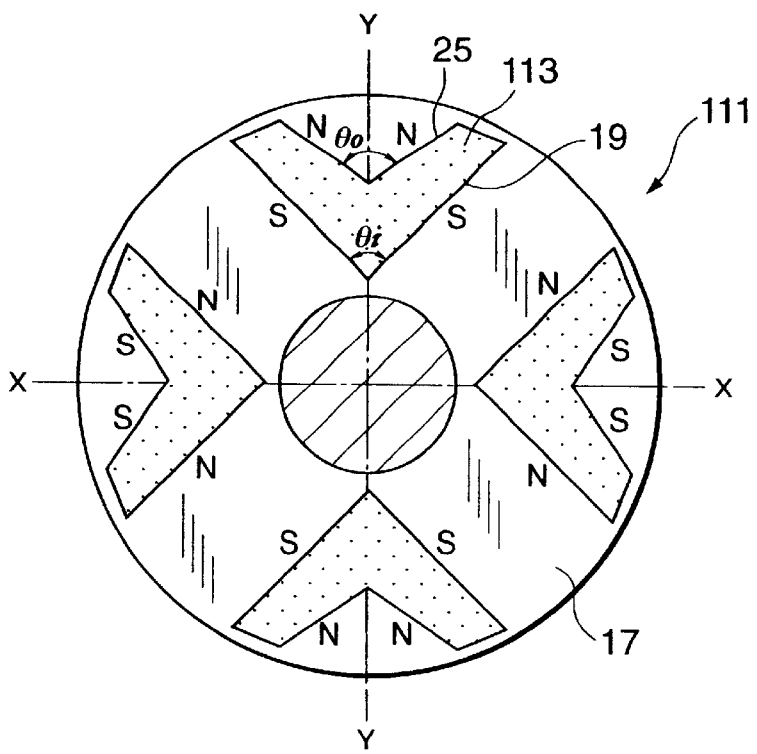
FIG. 11 is a schematic cross-sectional view of a rotor of a synchronous motor according to a seventh embodiment of this invention.

A seventh embodiment of this invention will be described with reference to FIG. 11.

A rotor 111 of a synchronous motor according to this embodiment is provided with four magnets 113 as in the case of the sixth embodiments. In this embodiment, the arrangement of the sixth embodiment is reversed so that the narrow angle θi of the outer V-surface 19 in each magnet 113 is set to be smaller than the narrow angle θo of the inner V-surface 25. In other respects, the rotor 111 is identical to the rotor 101 of the sixth embodiment.

Since this setting increases the volume of the magnet 113, the magnetic flux is increased and it is possible to enhance the output power/torque characteristics of the synchronous motor.

It is clear from the above description that the sixth and seventh embodiments create different results. Thus the relationship of the narrow angle θi and the narrow angle θo may be selectively set according to the required characteristics of the synchronous motor.

In each of the first to seventh embodiments, the outward flat face 23 has been formed as a flat plane. However, it is possible to form this part to have an arc-shaped cross-section. Leakage flux can be further reduced by the use of such a curved face. Furthermore, by applying the arc-shaped cross-section at the end portion of the magnet, the thickness of the magnet varies smoothly towards the end and the concentration of stress under the action of a load is mitigated, so the structural strength of the rotor is increased.

An eighth embodiment of this invention will be described with reference to FIGS. 12–15.

Figure 12:
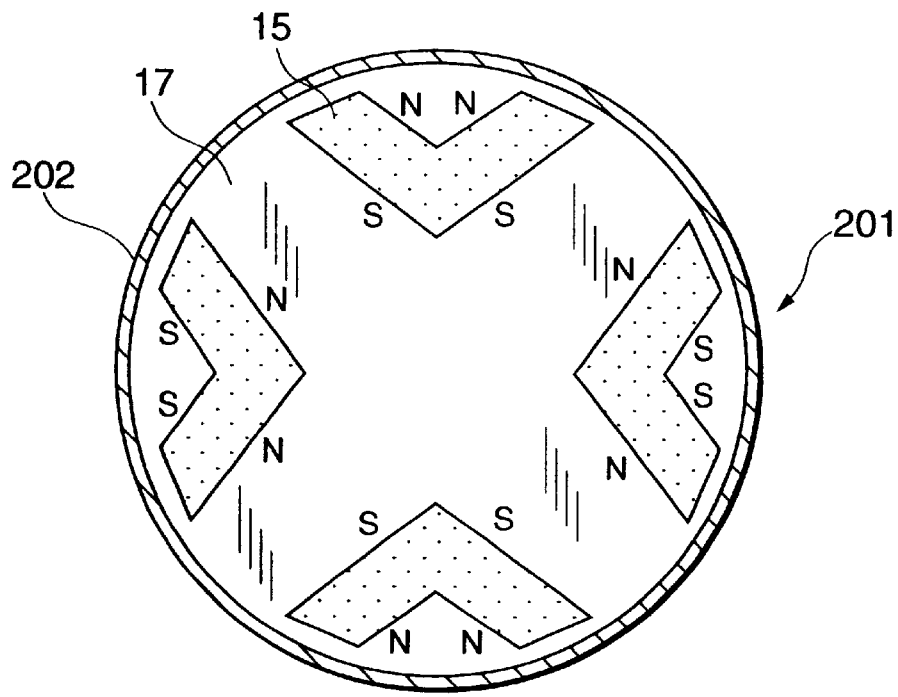
FIG. 12 is a schematic cross-sectional view of a rotor of a synchronous motor according to an eighth embodiment of this invention.

Referring first to FIG. 12, a rotor 201 according to this embodiment has a sleeve 202 fitted on an outer periphery of the core 17. The core 17 is identical to the core 17 of the first embodiment. The sleeve 202 is made of non-magnetic materials such as Kevlar or carbon in the form of a band and tightly wound around the core 17. Alternatively, a non-magnetic stainless steel sleeve may be press fitted to the outer periphery of the core 17. By providing such a sleeve 202, the structural strength of the core 17 is increased. In other respects, the rotor 201 is identical to the rotor 11 of the first embodiment.

Figure 13:
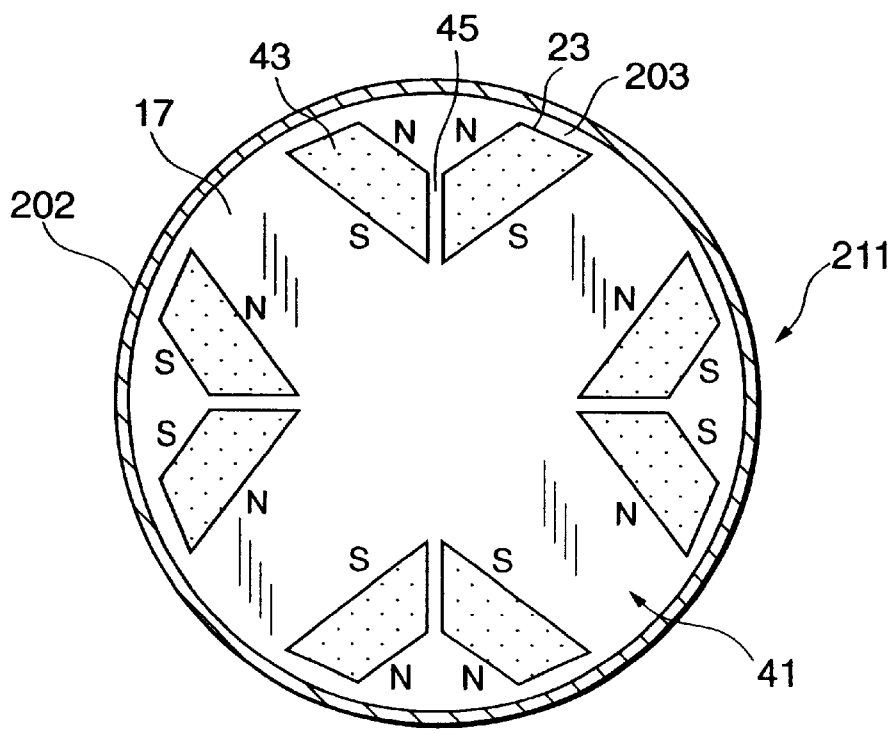
FIG. 13 is similar to FIG. 12, but showing a variation of the rotor of the eighth embodiment of this invention with respect to a cross-sectional shape of the magnets.

The sleeve 202 may also be fitted to the outer periphery of the rotor 41 of the second embodiment. A rotor 211 shown in FIG. 13 is such an example.

In the second embodiment, a sufficient depth of covering of the core 17 covering the outward flat face 23 of the magnet 43 is required in order to ensure the structural strength of the rotor 41.

However, it is possible to reduce the depth of the covering without affecting the structural strength of the rotor 41 by fitting the sleeve 202 to the outer periphery of the core 17. Such an improvement in strength allows the gap 45 between adjacent magnetic magnet elements 43A and 43B to be reduced. Since the core 17 acts as a circuit for leakage flux between different poles of the magnet 43 at a part corresponding to the gap 45 or a covering 203 in FIG. 13, the leakage flux is reduced by reducing the size of the covering 203 or the gap 45.

Figure 14:
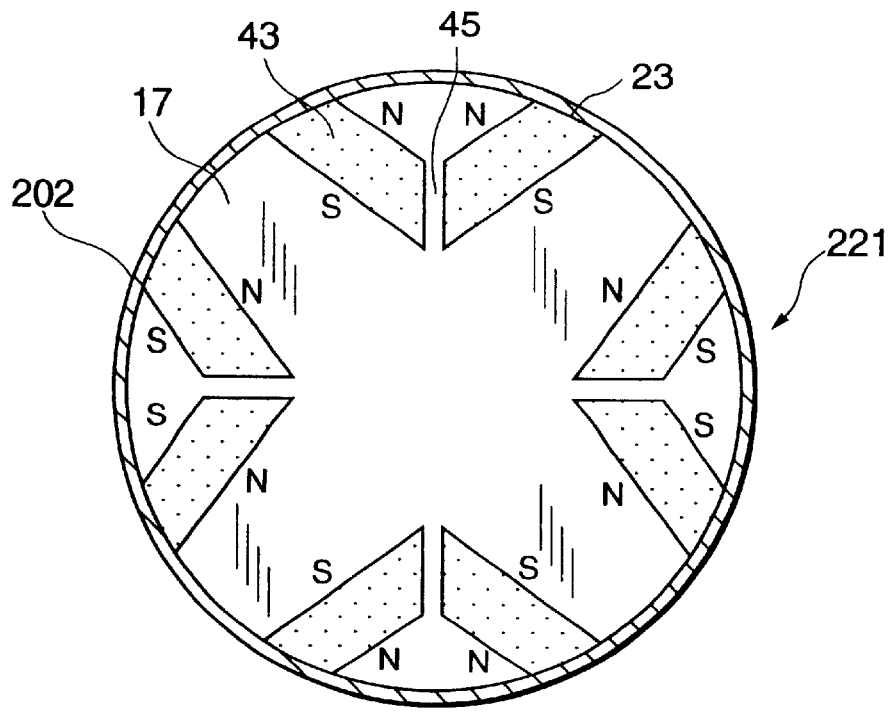
FIG. 14 is similar to FIG. 13, but showing another variation of the rotor of the eighth embodiment of this invention with respect to the location of the magnets.

In a rotor 221 shown in FIG. 14, a covering 203 is equal to zero and the outward flat face 23 of the magnet 43 directly contacts the sleeve 202. This allows the leakage flux passing through the covering 203 to be zero.

Figure 15:
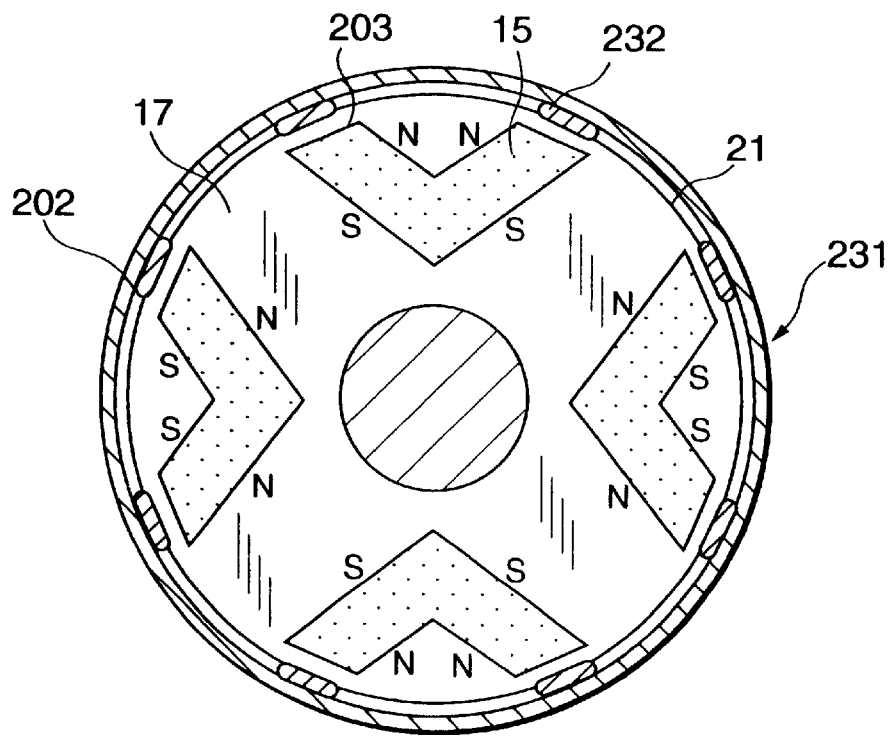
FIG. 15 is similar to FIG. 12, but showing yet another variation of the rotor of the eighth embodiment of this invention that is arranged to have support members.

A rotor 231 shown in FIG. 15 has support members 232 made of non-magnetic materials such as plastic between the magnet 15 and the sleeve 202.

The support member 232 transmits the tightening force of the sleeve 202 onto the covering 203 of the core 17. By locally pressing the covering 203 of the core 17 in this way, the magnetic characteristics of the covering 203 are varied to reduce leakage flux.

Figure 16:
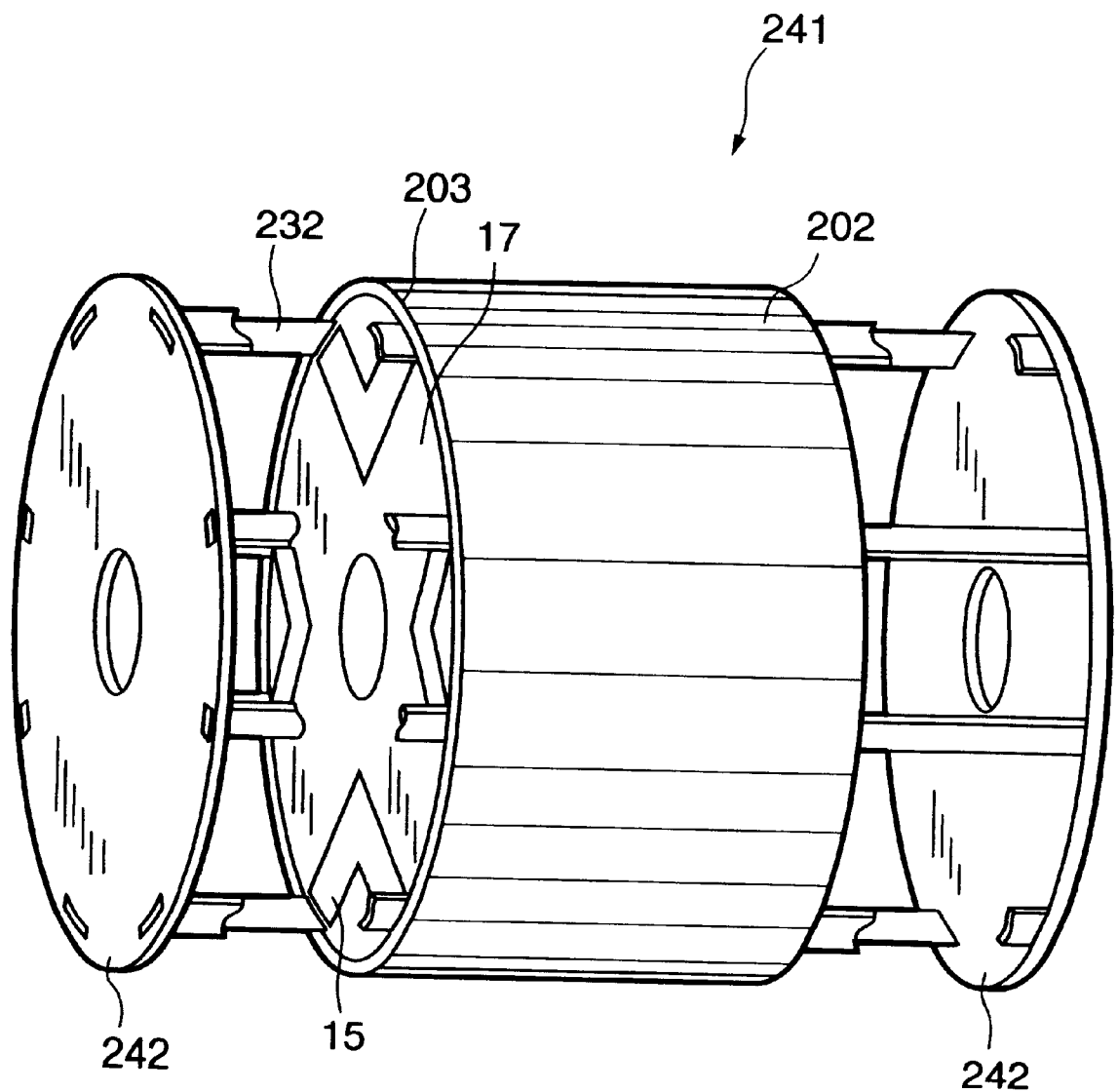
FIG. 16 is a perspective view of a rotor of a synchronous motor according to a ninth embodiment of this invention.

A ninth embodiment of this invention will be described with reference to FIG. 16.

A rotor 241 of a synchronous motor according to this embodiment has support members 232 similar to those of the rotor 231 of the eighth embodiment. In this embodiment, however, the support members 232 are projecting from the core 17 axially in both directions and a disk-shaped end plate 242 is fitted to both ends of the support members 232. In other respects, the rotor 241 is identical to the rotor 231 of the eighth embodiment.

The provision of the end plates 242 enhances the strength of the rotor 241 and the synchronous motor may bear a rotation at higher speed.

The contents of Tokugan 2000-49622 with a filing date of Feb. 25, 2000 in Japan, and Tokugan 2000-290683 with a filing date of Sep. 25, 2000 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

1. A rotor for a synchronous motor, comprising:
   a rotation shaft provided in the center of the rotor and rotating together with the rotor;
   a plurality of magnets, each magnet having V-shaped cross-section, the V-shaped cross-section being defined by an inner V-surface having an acute angle point, an outer V-surface having an acute angle point and an outward face facing outwardly and connecting the inner V-surface and the outer V-surface, each of the magnets being disposed to cause the acute angle points of the inner V-surface and the acute angle point of the outer V-surface to be directed towards the rotation shaft, being magnetized to cause the inner V-surface and the outer V-surface to have a different polarity, and having dimensions to cause a second angle β to be greater than twenty percent of a first angle α wherein the first angle α is an angle subtended between a first straight line connecting an intersection point of the outer V-surface and the outward face and the center of the rotor and a second straight line connecting the center of the rotor and the acute angle point of the outer V-surface, and the second angle β is an angle subtended between the first straight line and a third straight line connecting an intersection point of the inner V-surface and the outward face and the center of the rotor; and
   a core made of a magnetic material which is fixed to the rotation shaft to retain the magnets.

2. The rotor as defined in claim 1, wherein the second angle β is set to a value in a range from forty to eighty percent of the first angle α.

3. The rotor as defined in claim 1, wherein each of the magnets comprises a pair of magnet elements separated by a gap containing a straight line passing through the acute angle point of the inner V-surface and the acute angle point of the outer V-surface.

4. The rotor as defined in claim 3, wherein the gap is presented between pre-formed two independent spaces housing the pair of magnet elements in the core.

5. The rotor as defined in claim 1, wherein the core has hollow parts each of which has a substantially triangular cross-section and is formed between an outer periphery of the core and the inner V-surface of each of the magnets.

6. The rotor as defined in claim 5, wherein a base of the cross-section of each hollow part is defined by an convex curve bulged outwardly.

7. The rotor as defined in claim 1, wherein the outer V-surface and the outward face are connected via a flat face defined by a straight line passing through the center of the rotor.

8. The rotor as defined in claim 1, wherein the core has a hollow part which faces the flat face.

9. The rotor as defined in claim 1, wherein a magnet has a flat face dividing the outer V-surface into two surfaces, the flat face being defined by a straight line orthogonal to the second straight line.

10. The rotor as defined in claim 1, wherein a narrow angle θi of the outer V-surface is set to be greater than a narrow angle θo of the inner V-surface.

11. The rotor as defined in claim 1, wherein a narrow angle θi of the outer V-surface is set to be smaller than a narrow angle θo of the inner V-surface.

12. The rotor as defined in claim 1, wherein an outward face is formed to have an arc-shaped cross-section of which an arc is substantially parallel with an outer periphery of the core.

13. The rotor as defined in claim 1, wherein the rotor further comprises a sleeve made of a non-magnetic material which is fitted on an outer periphery of the core and exerts a tightening force on the core.

14. The rotor as defined in claim 13, wherein the core has coverings each of which covers each of the outward faces, the rotor further comprises support members each of which is made of a non-magnetic material and is gripped between the core and the sleeve to transmit the tightening force of the sleeve to the coverings.

15. The rotor as defined in claim 14, wherein the support members are arranged to project from the core in a direction parallel to the rotation shaft and the rotor further comprises an end plate fixed to projecting ends of the support members.

* * * * *